United States Patent
Puryk et al.

(10) Patent No.: US 10,791,677 B2
(45) Date of Patent: Oct. 6, 2020

(54) RETURN PAN FOR AN AGRICULTURAL COMBINE

(71) Applicant: Deere & Company, Moline, IL (US)

(72) Inventors: Corwin M. Puryk, Bettendorf, IA (US); Volker Fuchs, Bettendorf, IA (US); Anil Kumar Beeka, Alwar (IN)

(73) Assignee: DEERE & COMPANY, Moline, IL (US)

( * ) Notice: Subject to any disclaimer, the term of this patent is extended or adjusted under 35 U.S.C. 154(b) by 138 days.

(21) Appl. No.: 16/124,198

(22) Filed: Sep. 7, 2018

(65) Prior Publication Data

US 2019/0174678 A1    Jun. 13, 2019

Related U.S. Application Data

(60) Provisional application No. 62/596,818, filed on Dec. 9, 2017.

(51) Int. Cl.

| | |
|---|---|
| *A01F 12/44* | (2006.01) |
| *A01F 12/46* | (2006.01) |
| *A01D 75/28* | (2006.01) |
| *A01F 12/52* | (2006.01) |
| *A01F 7/06* | (2006.01) |

(Continued)

(52) U.S. Cl.
CPC ............. *A01F 12/52* (2013.01); *A01D 41/12* (2013.01); *A01D 75/282* (2013.01); *A01F 7/067* (2013.01); *A01F 12/34* (2013.01); *A01F 12/44* (2013.01); *A01F 12/442* (2013.01); *A01F 12/446* (2013.01); *A01F 12/46* (2013.01)

(58) Field of Classification Search
CPC ....... A01D 41/12; A01D 75/282; A01F 7/067; A01F 12/52; A01F 12/34; A01F 12/44; A01F 12/46; A01F 12/442; A01F 12/444; A01F 12/446; A01F 12/184; A01F 12/182
See application file for complete search history.

(56) References Cited

U.S. PATENT DOCUMENTS

| | | | | |
|---|---|---|---|---|
| 2,893,558 A | * | 7/1959 | Zollinger | A01D 75/282 209/254 |
| 3,108,064 A | * | 10/1963 | Grant | A01D 75/282 209/247 |

(Continued)

FOREIGN PATENT DOCUMENTS

| | | | | |
|---|---|---|---|---|
| DE | 2425702 | * | 9/2010 | A01D 75/28 |
| EP | 0282736 A1 | | 9/1988 | |

(Continued)

OTHER PUBLICATIONS

European Search Report issued in counterpart European Patent Application No. 18210414.1, dated May 27, 2019 (7 pages).

*Primary Examiner* — Robert E Pezzuto
*Assistant Examiner* — Adam J Behrens
(74) *Attorney, Agent, or Firm* — Taft Stettinius & Hollister LLP; Stephen F. Rost

(57) ABSTRACT

A separating and cleaning mechanism for an agricultural combine may include: a return pan. The return pan includes a textured floor, two augers, and two motors coupled to the two augers, respectively, to selectively drive the motors in rotation independently. The textured floor may oscillate in a fore-and-aft direction to move grain toward the two augers.

20 Claims, 4 Drawing Sheets

(51) Int. Cl.
*A01F 12/34* (2006.01)
*A01D 41/12* (2006.01)

(56) References Cited

U.S. PATENT DOCUMENTS

| | | | | |
|---|---|---|---|---|
| 3,581,746 A | * | 6/1971 | Louks | A01D 75/282 460/9 |
| 3,916,912 A | * | 11/1975 | Rowland-Hill | A01F 12/44 460/66 |
| 7,220,179 B2 | | 5/2007 | Redekop et al. | |

FOREIGN PATENT DOCUMENTS

| | | | | | |
|---|---|---|---|---|---|
| EP | 2055178 | A2 | | 5/2009 | |
| EP | 2425702 | A1 | * | 3/2012 | ........... A01D 75/282 |
| GB | 922907 | A | * | 4/1963 | ........... A01D 75/282 |

* cited by examiner

RETURN PAN FOR AN AGRICULTURAL COMBINE

FIELD OF THE INVENTION

This invention relates to agricultural combines. In particular, it relates to threshing, separating and cleaning mechanisms for agricultural combines. More particularly, it relates to return pans.

BACKGROUND OF THE INVENTION

Agricultural harvesters such as combines or windrowers, travel through fields of agricultural crop harvesting the crop. In one common arrangement, agricultural harvesting heads extend forward from the agricultural harvester to engage the plant stalks, sever them, and carry the severed crop into the body of the agricultural harvester itself for further processing.

The threshing, cleaning and separating mechanism inside the agricultural combine typically includes a rotor disposed inside a concave grating. Cut crop material is fed between the rotating rotor and the stationary grating to thresh and separate the crop.

The grain falls through holes in the grating and onto a sieve and/or chaffer in a cleaning shoe. Sieves and chaffers are generally planar sheets with holes in them through which air is blown. The air lifts the residue and carries it away to the end of the combine. The grain, being heavier, falls through the holes in the sieves and chaffers and is gathered in the bottom of the cleaning shoe to be conveyed to the top of the combine and deposited in a grain tank or grain reservoir.

Sieves and chaffers work best if the grain is evenly distributed across their width. A thick pile of grain and residue falling directly on top of the sieve or chaffer will cause it to work extremely inefficiently or even stop working entirely. For that reason, it is beneficial to take the dirty grain falling through holes in the grating and deposit it on an intermediate sheet called a "return pan". Return pans are typically flat, with textured upper surfaces that are shaken during operation.

The grain falls on the return pan, is spread out (side to side), and is carried to a forward end of the return pan, preferably in an even thickness. The grain falls off the forward end of the return pan and onto the forward end of the sieve/chaffer underneath the return pan. This tends to deposit an even thickness of grain across the width of the sieve/chaffer. This even thickness promotes effective cleaning by the sieve/chaffer.

The return pan does not always spread the grain out evenly. This is a problem, for example, when the combine tilts during operation on the side of a hill.

In one arrangement, shown in British patent GB 922907, this problem is mitigated by providing an auger with helical flights across the forward end of the return pan. This auger is mounted above the surface of the return pan with flights that extend downward to the top of the return pan above the textured surface, The auger levels the dirty grain before it falls off the return pan.

The '907 auger is driven in one direction so that it drags dirty grain inwardly from both opposing sides of the return pan towards the middle of the return pan, knocking the tops off any piles of dirty grain above a predetermined height.

The '907 arrangement is not very flexible or effective. When traveling on a slope, it would be better to spread the grain to one side of the return pan rather than steer it to the middle from both directions as provided in the '907 patent.

What is needed is a return pan that provides improved distribution of dirty grain across the width of the return pan. It is an object of this invention to provide such a return pan.

SUMMARY OF THE INVENTION

In accordance with a first aspect of the invention, a return pan for an agricultural combine for harvesting crops in an agricultural field and having a direction of travel through the field, wherein the return pan comprises: a textured floor configured to push grain toward an exit of the return pan when the return pan is oscillated in a fore-and-aft direction; a first auger and a second auger that extend across an exit of the textured floor generally perpendicular to the fore-and-aft direction; a first motor coupled to the first auger to drive the first auger in rotation; and a second motor coupled to the second auger to drive the second auger in rotation.

The return pan may comprise two side walls and a rear wall fixed to the textured floor and extending upward from the textured floor. The first auger and the second auger may be oriented in an end-to-end relationship. The first auger and the second auger may rotate about parallel axes. The first auger and the second auger may be arranged to be selectively driven in opposite rotational directions and to be selectively driven in the same rotational direction. The textured floor may be planar over substantially the entire width and length of the return pan. The return pan may be disposed below a separating rotor and concave grating and above a sieve or chaffer. The return pan may be disposed below a residue beater rotor and associated grating. The first motor may be connected to the first auger with a first belt and pulley arrangement. The second motor may be connected to the second auger with a first belt and pulley arrangement. The first motor and the second motor may be fixed underneath the textured floor of the return pan.

In accordance with the second aspect of the invention, a separating and cleaning mechanism for an agricultural combine comprises: a rotor and concave arrangement for separating grain from plant residue; a return pan disposed underneath the rotor and concave arrangement to receive threshed and separated grain from the rotor and concave arrangement, wherein the return pan further comprises: a textured floor configured to push grain toward an exit of the return pan when the return pan is oscillated in a fore-and-aft direction, a first auger and a second auger that extend across an exit of the textured floor generally perpendicular to the fore-and-aft direction, a first motor coupled to the first auger to drive the first auger in rotation, and a second motor coupled to the second auger to drive the second auger in rotation; and a cleaning shoe including at least a cleaning fan and a sieve or chaffer disposed underneath the return pan to receive the threshed and separated grain from the return pan and to further clean the threshed and separated grain.

The mechanism may further comprise two side walls and a rear wall fixed to the textured floor and extending upward from the textured floor. The first auger and the second auger may be oriented in an end-to-end relationship. The first auger and the second auger may rotate rotate about parallel axes. The first auger and the second auger may be arranged to be selectively driven in opposite rotational directions in one mode of operation and to be selectively driven in the same rotational direction in a second mode of operation. The textured floor may be planar over substantially the entire width and length of the return pan. The mechanism may further comprise a curved pan fixed to a forward edge of the textured floor and extending forward and downward therefrom. The curved pan may curve around a lower edge of the first auger to define a gap between the curved pan and the first auger. The first auger and the second auger may rotate about non-parallel axes. The first motor may be connected to the first auger with a chain and sprocket arrangement. The first motor and the second motor may be electric or hydraulic motors. The size of the gap between the first auger and the curved pan may be adjustable. The curved pan may wrap around the auger, and an angle of wrap of the curved pan around the auger may be adjustable. The return pan may be further disposed below a separator grating. The return pan may be disposed below a threshing portion of a rotor and threshing grating. The return pan may be disposed below a separating portion of a rotor and separator grating.

DETAILED DESCRIPTION OF THE PREFERRED EMBODIMENTS

Figure 1:
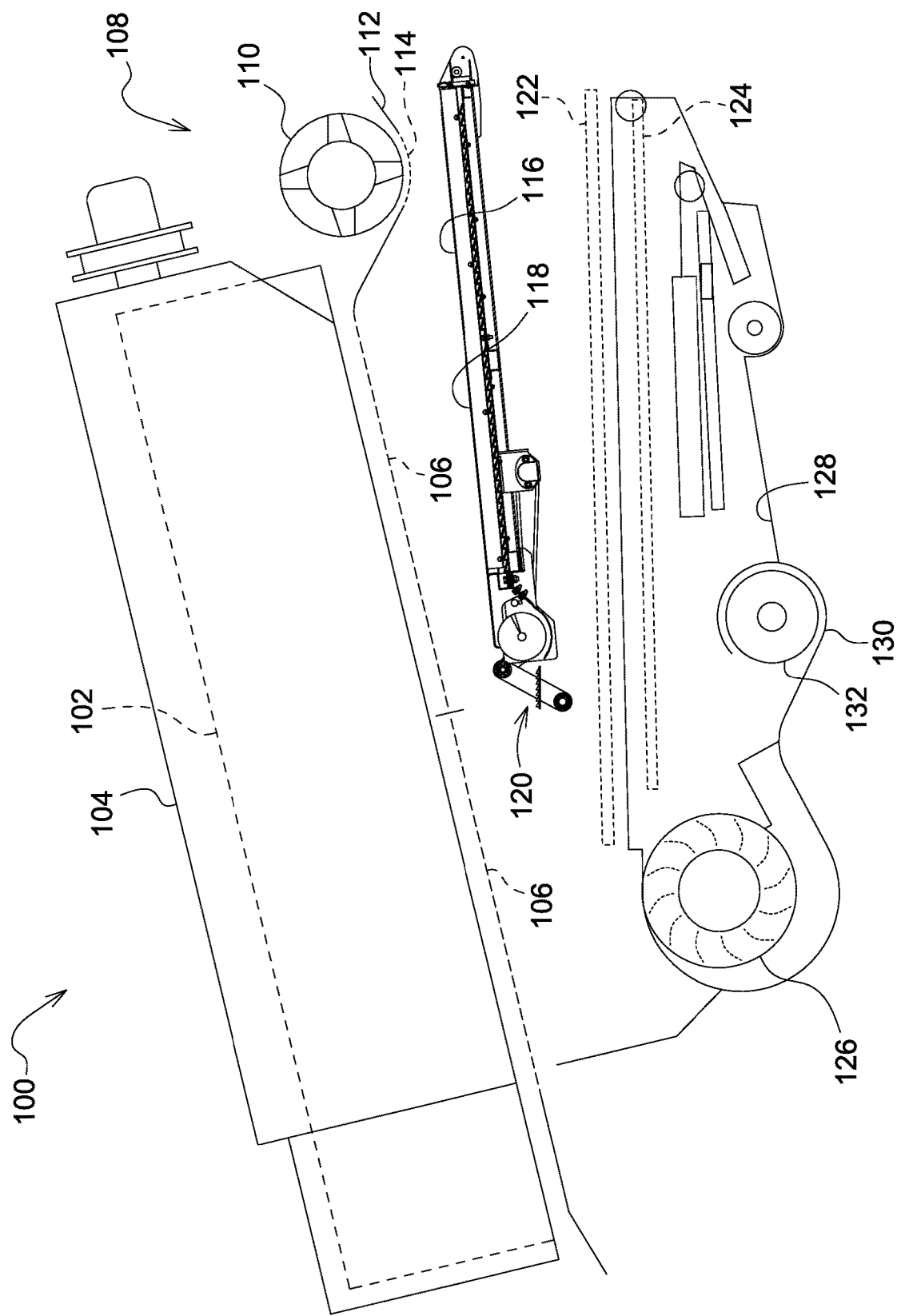
FIG. 1 is a side view of a threshing, separating, and cleaning mechanism in accordance with the present invention.

In FIG. 1 a threshing, separating, and cleaning mechanism 100 for an agricultural combine is shown. Mechanism 100 includes a rotor 102 disposed inside a cage 104. A forward portion of rotor 102 functions to thresh the crop material. A rear portion of rotor 102 functions to separate material other than grain from the grain itself.

The cage 104 has a concave grating 106 at the bottom that has many holes or apertures through which dirty grain can fall downward onto a return pan. The portion of the concave grating 106 disposed underneath the threshing portion of the rotor 102 is a threshing grating. The portion of the concave grating 106 disposed underneath the separating portion of the rotor 102 is a separating grating. Grain falls through both portions of the concave grating and therefore both portions of the concave grating separate grain from crop residue.

Cut crop material is inserted between the rotor 102 and the cage 104 such that it is pulled around the rotor between the rotor and the cage (and the concave). The residue portion of the cut crop material (typically including a little grain) is carried rearward and is released into a beater 108.

The beater rotor 110 rotates against a lower concave surface 112. Holes 114 in the lower concave surface 112 permit the residual grain to pass through and fall downward onto the return pan 116.

The return pan 116 is a generally flat planar surface 118 that extends laterally substantially the entire width of the mechanism 100, and therefore can collect all of the grain falling through holes in the concave grating 106 and holes 114 in the lower concave surface 112.

Dirty grain falling on the return pan 116 is carried to a forward outlet 120 of the return pan where it is released to fall on to a sieve and chaffer 122,124.

A cleaning fan 126 is disposed at a forward end of the sieve and chaffer to blow air rearward and upward underneath the sieve and chaffer, through the sieve and chaffer and rearward out of the end of the combine. The airflow generated by the fan 126 lifts the chaff and light residue upward, carrying it out the rear of the combine where it is deposited upon the ground. The airflow, however, is not strong enough to lift the now-clean grain. Instead, the grain falls downward onto the floor 128 of the cleaning shoe. The clean grain slides downward on the floor 128 and into a trough 130. The trough 130 surrounds an auger 132, which engages the clean grain in the trough 130 and carries it to one side of the combine for storage and offloading.

Figure 2:
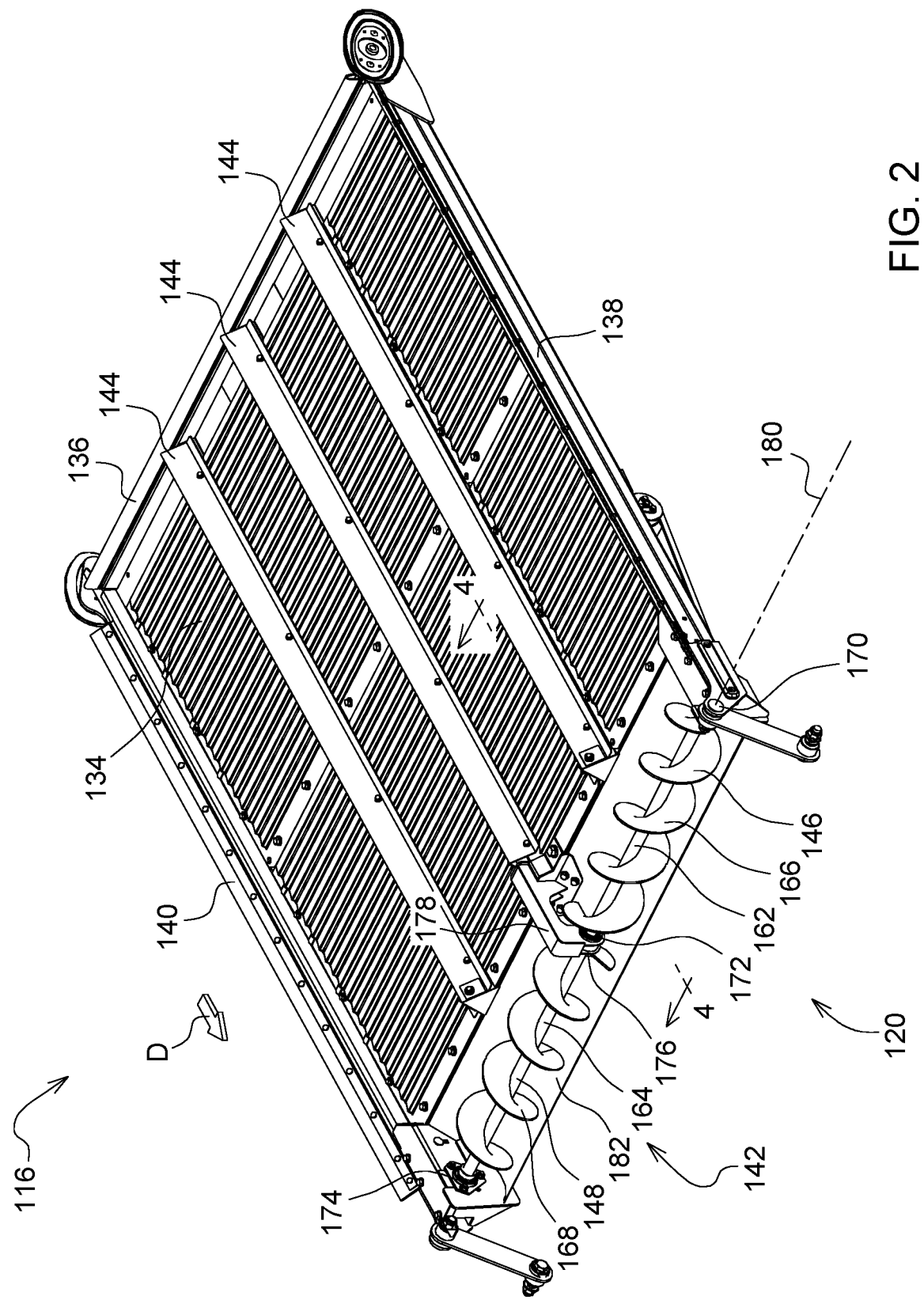
FIG. 2 is a perspective top view of the return pan of FIG. 1.
Figure 3:
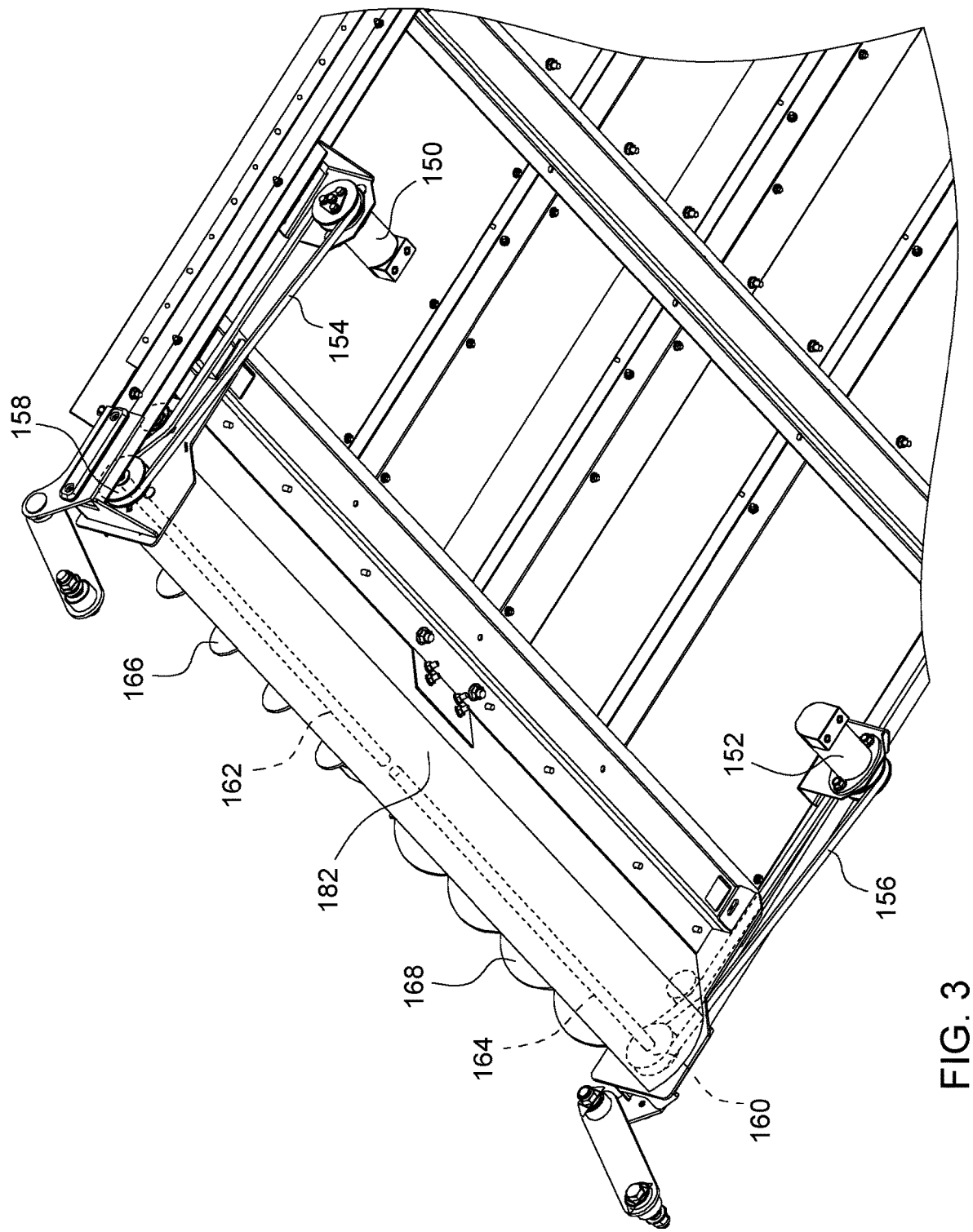
FIG. 3 is a perspective bottom view of the return pan of FIGS. 1-2.
Figure 4:
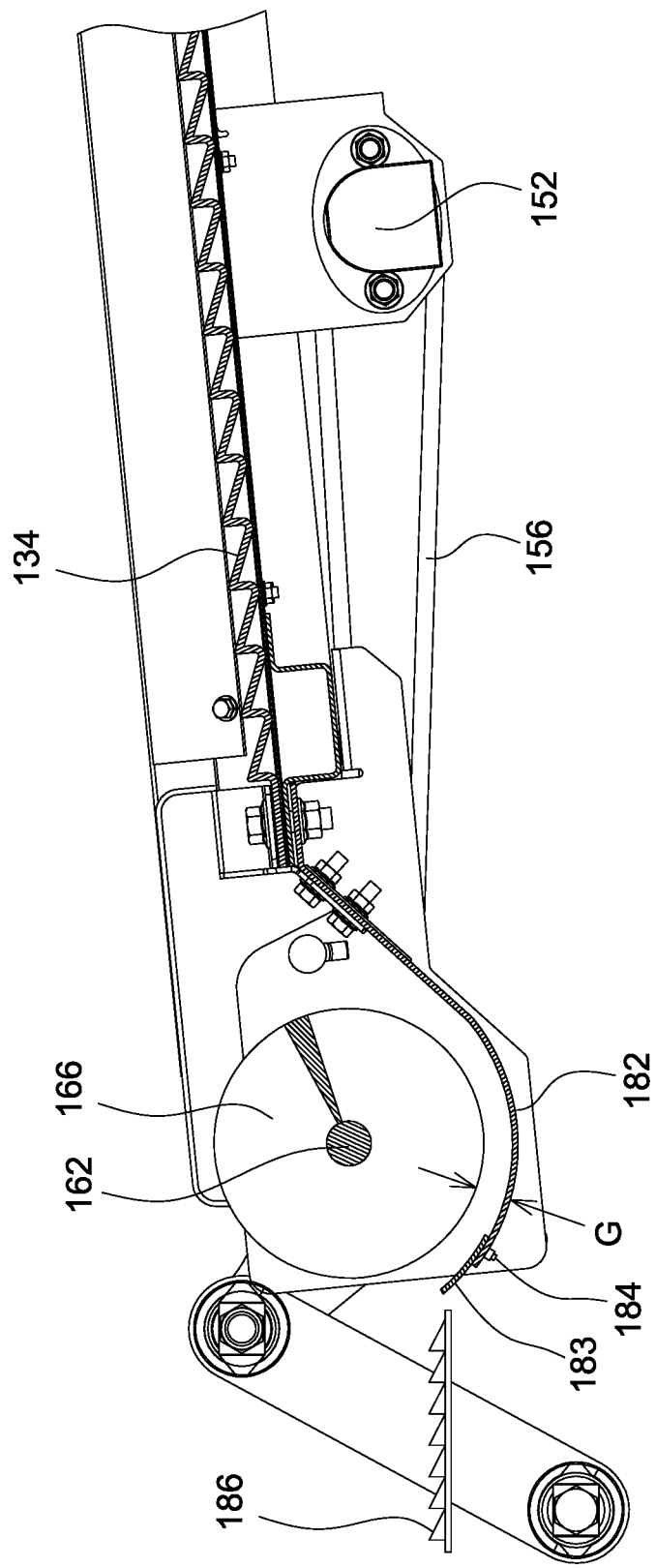
FIG. 4 is a cross-section of the return pan of FIGS. 1-3 taken at section line 4-4 in FIG. 2.

In FIG. 2, the return pan 116 is shown in greater detail. The return pan has a floor 134, a rear wall 136, and two side walls 138, 140. The return pan 116 has an exit 142 from which grain leaves the return pan 116. The floor 134 is divided into four separate sections that extend longitudinally and guide the dirty grain in four different channels. These channels are separated by ribs 144 that are fixed to and extend upwards from the floor 134. The ribs 144 function to keep the grain that falls on the floor 134 from shifting to one side or another as the grain is carried down the return pan 116 and thus travel more in the longitudinal direction "D" as it moves across the floor 134 towards the exit 142.

The metal panels that form the floor 134 of the return pan 116 are bent into a zigzag and sawtooth pattern to help convey the grain across the return pan 116.

The return pan 116 is supported on pivoting mounts and driven by reciprocating member so that it oscillates back and forth in the direction "D". The sawtooth arrangement of floor 134, combined with the oscillating movement, functions to propel the grain in the direction "D" toward the exit 142.

The grain arriving at the exit 142 is still not evenly distributed across the width of the return pan 116, however. For that reason, two auger conveyors 146, 148 are fixed to and disposed across the front of the return pan 116. The two auger conveyors are driven by two motors 150, 152, respectively. Motors 150, 152 may be electric or hydraulic motors and may include a gearbox. Motors 150, 152 are fixed to the bottom of the return pan 116 and are coupled to the auger conveyors 146 148 by belts 154, 156, respectively. Motors 150, 152 may be mounted above the return pan. Belts 154, 156 are coupled to and drive pulleys 158, 160, respectively. Belts 154, 156 may be chain belts. Pulleys 158, 160 are fixed to auger shafts 162, 164, respectively. Pulleys 158, 160 may be gears or sprockets. The auger shafts 162, 164 are fixed to helical auger flights 166, 168, respectively. The motors 150, 152 may be electrically or hydraulically driven.

Auger shaft 162 is supported on a bearing 170 at its outer end and a bearing 172 at its inner end. Auger shaft 164 is supported on a bearing 174 at its outer end and a bearing 176 at its inner end. Bearings 170, 172, 174, 176 may be adjustable bearings to permit them to be raised and lowered with respect to the auger trough, thus varying the distance between the outer edges of the helical flights and the trough (the gap "G").

A common bearing mount 178 is fixed to the floor 128 and supports bearings 172, 176. The auger shafts 162, 164 are supported on their bearings to rotate about a common axis 180. Alternatively, they may be supported on non-parallel axes 180.

A curved pan 182 is mounted on the forward edge of the floor 134 and extends downward and outward therefrom. The curved pan 182 curves around and is spaced slightly away from the outermost edges of the auger flights 166, 168. Together, the augers and pan form a gap "G" between the auger flights 166, 168 and the curved pan 182. The augers and the curved pan extend substantially the entire width of the return pan. The curved pan 182 is adjustable such that it can be extended or retracted in a direction generally perpendicular to the axis of the auger conveyors 146, 148 and in a direction parallel to the circumference of the swept area of the auger flights, thereby permitting the operator to vary how much the curved pan 182 wraps around the auger conveyors 146, 148.

This adjustability is provided by an elongate strip 183 that is adjustably attached to the curved pan 182 with fasteners 184. The fasteners 184 can be loosened and the elongate strip can then be extended or retracted until the curved pan 182 wraps around the auger conveyors the proper amount, and then the fasteners can be tightened to hold the strip in position.

An extension pan 186 may be provided that extends across the lateral width of the curved pan 182. This pan includes a textured, upwardly-facing upper surface that oscillates together with the return pan. If provided, the extension pan 186 receives grain exiting the two auger conveyors 146, 148 and provides some additional grain leveling capacity before the grain falls off the extension pan 186.

Since two motors are provided to drive two separate augers, the augers can spread the grain leaving the return pan in a variety of ways not suggested in the prior art.

First, the motors are bidirectional. They can be controlled to rotate in either direction by reversing the flow of electricity through the motor, or by reversing the flow of hydraulic fluid through the motor.

The motors can drive the augers to simultaneously draw grain inward to the middle of the return pan 116 as indicated in the prior art. This is beneficial if grain is heaped on the outer edges of the return pan and needs to be brought inwardly from the opposing sides.

By reversing the direction of the motors, they can drive the augers to push grain outwardly from the middle of the return pan more toward both outer lateral sides of the return pan. This is beneficial if the grain is heaped in the center of the return pan and needs to be spread evenly and outwardly toward both sides.

Since the motors can be independently driven in different rotational directions, the motors can drive the augers to convey grain from the left side of the return pan toward the right side of the return pan. This is beneficial if the grain is heaped along the left side of the return pan, for example, and should be conveyed not merely toward the middle of the return pan, but beyond the middle and further towards the right side of the return pan. This can occur, for example, when the combine body is tilted upward on the right side and downward on the left side, such as when traveling on the side of the hill.

The direction of the motors can be reversed and they can drive the augers to convey grain from the right side of the return pan to the left side of the return pan. This is beneficial if the grain is in a large heap along the right side of the return pan and must be conveyed not merely toward the middle of the return pan, but beyond the middle and further towards the left side of the return pan. This can occur, for example, when the combine body is tilted upward on the left side and downward on the right side, such as when traveling on the side of the hill.

Thus, no matter where the grain accumulates on the return pan—in the middle of the return pan, on both sides of the return pan, on the left side of the return pan, and on the right side of the return pan—the grain leaving the return pan can be spread across the exit of the return pan in a more even layer.

The claims below define the invention. The description and figures above are provided to enable one skilled in the art to make and use the invention. Other ways of making and using the invention will be apparent to those skilled in the art.

The invention claimed is:

1. A return pan for an agricultural combine for harvesting crops in an agricultural field and having a direction of travel through the field, wherein the return pan comprises:
   a textured floor configured to push grain toward an exit of the return pan when the return pan is oscillated in a fore-and-aft direction;
   a first auger and a second auger that extend across a forward edge of the textured floor generally perpendicular to the fore-and-aft direction;
   a first motor coupled to the first auger to drive the first auger in rotation; and
   a second motor coupled to the second auger to drive the second auger in rotation;
   wherein the first auger and the second auger are arranged to be selectively driven in opposite rotational directions and to be selectively driven in the same rotational direction.

2. The return pan of claim 1, further comprising two side walls and a rear wall fixed to the textured floor and extending upward from the textured floor.

3. The return pan of claim 1, wherein the first auger and the second auger are oriented in an end-to-end relationship.

4. The return pan of claim 1, wherein the first auger and the second auger rotate about parallel axes.

5. The return pan of claim 1, wherein the textured floor is planar over substantially the entire width and length of the return pan.

6. The return pan of claim 1, wherein the return pan is disposed below a separating rotor and concave grating and above a sieve or chaffer.

7. The return pan of claim 1, wherein the return pan is disposed below a residue beater rotor and associated grating.

8. The return pan of claim 1, wherein the first motor is connected to the first auger with a first belt and pulley arrangement; and
   wherein the second motor is connected to the second auger with a second belt and pulley arrangement.

9. The return pan of claim 1, wherein the first motor and the second motor are fixed underneath the textured floor of the return pan.

10. A separating and cleaning mechanism for an agricultural combine comprising:
    a return pan comprising:
    a textured floor configured to push grain toward an exit of the return pan when the return pan is oscillated in a fore-and-aft direction,
    a first auger and a second auger that extend across a forward edge of the textured floor generally perpendicular to the fore-and-aft direction,
    a first motor coupled to the first auger to selectively drive the first auger in different rotational directions, a second motor coupled to the second auger to selectively drive the second auger different rotational directions; and
    wherein the selective rotation of the first and second augers are independent of each other.

11. The mechanism of claim 10, further comprising two side walls and a rear wall fixed to the textured floor and extending upward from the textured floor.

12. The mechanism of claim 10, wherein the first auger and the second auger are oriented in an end-to-end relationship.

13. The mechanism of claim 10, wherein the first auger and the second auger rotate about parallel axes.

14. The mechanism of claim 10, wherein the first auger and the second auger are arranged to be selectively driven in opposite rotational directions in one mode of operation and to be selectively driven in the same rotational direction in a second mode of operation.

15. The mechanism of claim 10, wherein the textured floor is planar over substantially the entire width and length of the return pan.

16. A return pan for an agricultural combine for harvesting crops in an agricultural field and having a direction of travel through the field, wherein the return pan comprises:
- a textured floor configured to push grain toward an exit of the return pan when the return pan is oscillated in a fore-and-aft direction;
- a first auger and a second auger that extend across a forward edge of the textured floor generally perpendicular to the fore-and-aft direction;
- a first motor coupled to the first auger to drive the first auger in rotation;
- a second motor coupled to the second auger to drive the second auger in rotation; and
- a curved pan fixed to the forward edge of the textured floor and extending forward and downward therefrom.

17. The return pan of claim 16, wherein the curved pan curves around a lower edge of the first auger to define a gap between the curved pan and the first auger.

18. The return pan of claim 17, wherein the size of the gap between the first auger and the curved pan is adjustable.

19. The return pan of claim 17, wherein curved pan wraps around the first auger and the second auger, and wherein an angle of wrap of the curved pan around the first auger and the second auger is adjustable.

20. The return pan of claim 10, further comprising:
- a rotor and concave arrangement for separating grain from plant residue, wherein the return pan is disposed underneath the rotor and concave arrangement to receive threshed and separated grain from the rotor and concave arrangement; and
- a cleaning shoe including at least a cleaning fan and a sieve or chaffer disposed underneath the return pan to receive the threshed and separated grain from the return pan and to further clean the threshed and separated grain.

* * * * *